Patented Apr. 5, 1938

2,112,883

UNITED STATES PATENT OFFICE 2,112,883

TREATMENT OF CELLULOSE ESTER MATERIALS

Henry Dreyfus, London, England

No Drawing. Application August 22, 1932, Serial No. 629,906. In Great Britain September 30, 1931

10 Claims. (Cl. 8—20)

This invention relates to the saponification of cellulose ester materials, particularly textile materials, for example, yarns, threads or fabrics.

It is frequently desired to effect partial or even more or less complete saponification of cellulose ester materials whether in filament, film or other form, in order to modify their properties, for example in respect of affinity for dyestuffs or in respect of their resistance to ironing or other heat treatment. For this purpose saponification has usually been effected by treating the materials with aqueous solutions of alkalies, particularly caustic soda. In many cases however a considerable loss of strength of the materials is experienced as a result of the treatment.

U. S. applications S. Nos. 287,034 and 287,035 filed 20th June, 1928, describe a new method of effecting saponification of cellulose acetate and other cellulose ester materials whereby the aforesaid difficulty may be overcome and products having desirable properties, for example in respect of strength, elasticity, handle and the like, obtained. According to these specifications, saponification is effected by subjecting the cellulose ester materials to the action of a gaseous or vaporous saponifying agent, preferably at a relatively low temperature, for example 25–30° C., and in the presence of water vapour.

It has now been found that the saponification of cellulose acetate and other cellulose ester materials may advantageously be effected with gaseous or vaporous saponifying agents at relatively high temperatures, for example 100–150° C. and/or in the absence or substantial absence of water or in the presence of water in restricted quantity. In this manner not only is the use of liquid treating baths avoided, but by-products of the saponifying reaction may be removed from the material as they are formed and products obtained of desirable properties as regards strength, handle and the like.

Yarn comprising filaments of cellulose acetate may for instance be subjected to the action of a current of ammonia gas, preferably diluted with nitrogen or air, at a temperature of 100–150° C. so that the by-product of saponification is acetamide and is substantially removed by the gaseous current as it is formed.

Any saponifiable derivatives of cellulose may be treated in accordance with the present invention. For example, instead of cellulose acetate, cellulose formate, propionate or butyrate may be saponified, partially or completely, in accordance with the new process. Further, the cellulose esters may be in filament, yarn, fabric, film or other form and in association or not with other materials, for example filaments, threads or the like of cotton, regenerated cellulose or other cellulosic material.

The materials may be saponified to any desired degree, for example they may be saponified only to such degree as is represented by a loss in weight of 1 to 10 per cent., for example sufficiently to impart affinity for direct cotton colours, or they may be saponified to a very substantial degree or even completely.

In effecting the saponification with gaseous ammonia the latter may be employed alone or mixed with other gases or vapours in small or large proportion. For instance, it may advantageously be mixed with gases which are inert with respect to the saponifying process, for example air but preferably nitrogen, as previously indicated, or other non-oxidizing gas. By such admixture the rate or degree of saponification may be controlled and at the same time the removal of by-products of the saponification facilitated. Again the ammonia may be used in admixture with water or other vapour for example vapours of organic substances. Any such admixture employed should not of course be such as will have a destructive or unfavourable effect upon the cellulose ester to be treated or upon the saponified product.

The temperatures at which the saponification is effected may vary within wide limits, for example temperatures of 80–100° C. and upwards may be employed. Where it is desired to remove by-products of the saponification process during the saponification itself the temperatures employed are preferably on the high side, for example 100–150° C. This is particularly the case when the saponifying reaction is effected in the presence of substantial proportions of water.

If desired the process may be carried out in the presence of substances facilitating the action of the ammonia on the cellulose ester, for example in the presence of organic substances having a softening or swelling action on the particular material under treatment. Such substances may for instance be relatively volatile, in which cases vapours may be mixed with the ammonia employed, or they may be of relatively low volatility, in which case they may be applied to the materials prior to the treatment of the latter with the saponifying agent. Such relatively volatile softening or swelling agents may be for instance hydrocarbons, particularly aromatic hydrocarbons, e. g. benzene, halogenated hydrocarbons, alcohols, e. g. ethyl or methyl alcohol, ketones and the like. Glycerin, glycol or other di- or poly-hydric alcohols may be mentioned as examples of substances of low volatility which may be applied to the materials before treatment with ammonia, in accordance with the new process.

Instead of or in admixture with ammonia other vaporous or gaseous saponifying agents for the cellulose esters may be employed, for example aliphatic or other organic amines, whether primary, secondary or tertiary, as examples of which may be mentioned mono-, di- or tri-methylamine, or the corresponding mono, di- or tri-ethylamine. These substituted ammonias may likewise be employed alone or in admixture with inert gases or vapours and in the presence or not of softening or swelling agents to facilitate the saponifying action.

The treatment with vapours of saponifying agents may be effected in any desired or convenient manner, for example the materials in the form of yarn or fabrics may be suspended in suitable chambers and treated therein with the gaseous current carrying or consisting of the saponifying agent. Again, yarn may be wound on to bobbins, preferably perforated, and the gaseous current comprising the saponifying agent blown or drawn therethrough at the desired temperature. In order to facilitate the passage of the saponifying gas or vapour, the bobbins or other packages may be cross-wound or otherwise prepared so as to facilitate the passage of the gas.

It has further been found that saponified materials of highly satisfactory properties may also be produced by the use of other methods of saponification wherein gaseous or vaporous saponifying agents are applied and the by-products of the reaction are removed during the process. For example, cellulose acetate materials may be subjected to a current of the heated vapour of an aliphatic alcohol, for example ethyl or methyl alcohol, in order to effect saponification and simultaneously carry away the acetic acid in the form of ethyl, methyl or other acetate. As when ammonia or other organic amine is employed as the saponifying agent, diluents may also be present. For instance the alcohol vapour or other saponifying agent may be admixed with nitrogen or other inert gas. Further, if desired, agents facilitating the saponification process may be present. Thus, for instance, the gaseous mixture comprising the saponifying agent may contain saponification catalysts, for example a tertiary base, e. g., trimethylamine, pyridine or dimethyl aniline. If desired such catalysts may be of relatively low volatility in which case they may be applied to the materials to be saponified prior to treatment with the vapour of the saponifying agent. In the case of saponifying with alcohol vapour, for instance, triethanolamine or like tertiary organic base of low volatility may be applied to the material as catalyst.

The following examples illustrate the invention without being in any way limitative:—

Example 1

Skeins of cellulose acetate artificial silk free from lubricants and size are suspended in a suitable chamber. A current of nitrogen or other inert gas containing ammonia gas to the extent of about 1% is produced by passing the inert gas through a vessel containing concentrated aqueous ammonia, and is then passed through the chamber containing the cellulose acetate skeins. The temperature of the gas current is maintained at about 100° C. Saponification proceeds easily and regularly and is stopped when the desired degree has been obtained.

Example 2

Skeins of cellulose acetate artificial silk free from lubricants and size are moistened with an aqueous solution of triethanolamine containing 5% on the weight of the goods of triethanolamine. The treated skeins are then suspended in a vessel into which is passed an inert gas such for example as nitrogen containing 5% of ethyl alcohol vapour, the temperature of the gaseous current being maintained at 100° C. Saponification proceeds uniformly and fairly rapidly, the reaction being catalyzed by the triethanolamine.

When the desired degree of saponification has been attained the skeins are removed from the chamber, rinsed to remove triethanolamine and dried.

What I claim and desire to secure by Letters Patent is:—

1. Process for the treatment of materials comprising cellulose esters, comprising subjecting them to the action of a current of a vaporous de-esterifying agent free of moisture at a temperature above 100° C.

2. Process for the treatment of materials comprising cellulose acetate, comprising subjecting them to the action of a current of ammonia free of moisture at a temperature above 100° C.

3. Process for the treatment of materials comprising cellulose acetate, comprising subjecting them to the action of a current of vapors of a volatile organic base free of moisture at a temperature above 100° C.

4. Process for the treatment of filaments, threads, yarns, films, fabrics and like materials comprising cellulose esters, which comprises subjecting said materials to the action of a current of a vaporous de-esterifying agent free from moisture at a temperature above 100° C.

5. Process for the treatment of filaments, threads, yarns, films, fabrics and like materials comprising cellulose acetate, which comprises subjecting said materials to the action of a current of ammonia free from moisture at a temperature above 100° C.

6. Process for the treatment of filaments, threads, yarns, films, fabrics and like materials comprising cellulose acetate, which comprises subjecting said materials to the action of a current of vapors of a volatile organic base free from moisture at a temperature above 100° C.

7. Process for the treatment of materials comprising cellulose esters, which comprises subjecting the materials to the action of a current of the vapor of a lower aliphatic amine free from moisture at a temperature above 100° C.

8. Process for the treatment of filaments, threads, yarns, films, fabrics and like materials comprising cellulose acetate, which comprises subjecting the materials to the action of a current of methylamine vapor free from moisture at a temperature above 100° C.

9. Process for the treatment of filaments, threads, yarns, films, fabrics and like materials comprising cellulose acetate, which comprises subjecting the materials to the action of a current of a vaporous de-esterifying agent in the presence of a tertiary organic base free from moisture at a temperature above 100° C.

10. Process for the treatment of filaments, threads, yarns, films, fabrics and like materials comprising cellulose acetate, which comprises subjecting the materials to the action of a current of the vapor of an aliphatic alcohol in the presence of a tertiary organic base free from moisture at a temperature above 100° C.

HENRY DREYFUS.